ates Patent [19] [11] 4,171,846
Isleif et al. [45] Oct. 23, 1979

[54] MOUNT FOR A WIND DEFLECTOR

[75] Inventors: Karl-Heinz Isleif, Percha; Hans Jardin, Inning, both of Fed. Rep. of Germany

[73] Assignee: Webasto Werk W. Baier GmbH & Co., Fed. Rep. of Germany

[21] Appl. No.: 853,272

[22] Filed: Nov. 21, 1977

[30] Foreign Application Priority Data

Nov. 27, 1976 [DE] Fed. Rep. of Germany ... 7637309[U]

[51] Int. Cl.² .................................................. B60J 1/20
[52] U.S. Cl. .................................................. 296/137 J
[58] Field of Search ............................. 296/137 J, 91

[56] References Cited
U.S. PATENT DOCUMENTS 3,427,067  2/1969  Kish .................................. 296/91 X

FOREIGN PATENT DOCUMENTS 1455838  6/1969  Fed. Rep. of Germany ........... 296/137

Primary Examiner—Joseph F. Peters, Jr.
Assistant Examiner—Norman L. Stack, Jr.
Attorney, Agent, or Firm—Craig and Antonelli

[57] ABSTRACT

A mount is provided for fixedly mounting a wind deflector to the roof of a passenger vehicle adjacent a closable roof opening. In order to accommodate utilization of a common mount for roof openings of different widths, the mount includes a first part which is attachable directly to a vertically extending frame part adjacent the roof opening and a second part attached to the wind deflector, with the second part being circular in shape and being connected at one edge in a rotatable manner to the first part.

7 Claims, 3 Drawing Figures

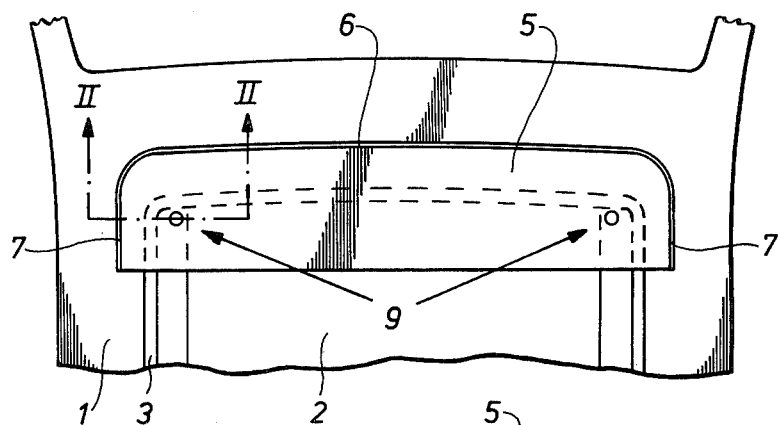
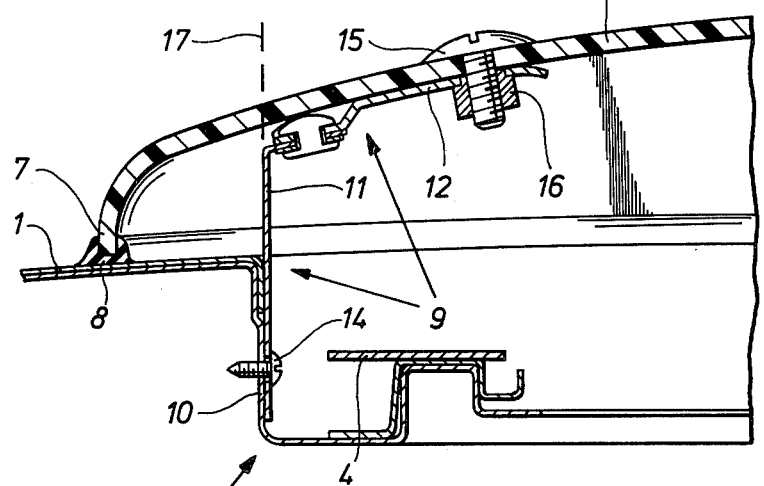
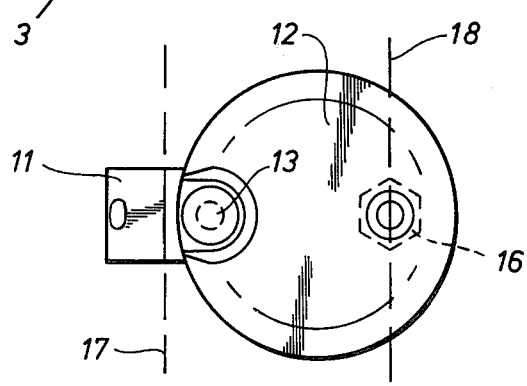

MOUNT FOR A WIND DEFLECTOR

BACKGROUND AND SUMMARY OF THE INVENTION

The invention relates to a mount for a wind deflector, said wind deflector being permanently mountable on a vehicle roof provided with a closable roof opening, said wind deflector resting on the vehicle roof along its forward edge and its lateral edges, whereby the mount is provided with fastening elements attachable on one side to the wind deflector and on the other side to a frame surrounding the roof opening.

Known mounts for wind deflectors generally consist of a bent sheet-metal strip, screwed near one end to the roof frame and near the other end to the wind deflector. Since such wind deflectors, generally designed for retrofitting to vehicle roofs, are made in only one size regardless of the width of the roof opening, a different mount must be used for each roof opening width, since the fastening point on the wind deflector is predetermined. In this connection, the term "roof opening width" will be understood to refer to the extent of the roof opening at right angles to the longitudinal axis of the vehicle.

An object of the invention is to provide a universally applicable mount for a wind deflector of the type described hereinabove. This object is achieved according to the invention by virtue of the fact that each fastening element includes two parts enclosing an angle, said parts being connected together rotatably, one of said parts being mountable on the wind deflector and the other part on the roof frame. By rotatably connecting the two parts relative to one another, the distance between the vertical planes in which the fastening point for the mount on the roof frame on the one hand and the fastening point for the mount on the wind deflector on the other hand are located, can be varied within relatively wide limits, so that the wind deflector can be mounted by means of a given mount both on a vehicle roof with a relatively narrow roof opening and on a vehicle roof with a relatively wide roof opening.

For reasons of appearance and strength, the part mountable on the wind deflector is preferably made circular and connected rotatably near its edge with the part designed to be mounted on the roof frame, whereby the latter part extends out at an obtuse angle from the circular part. In order to provide a considerable range of adjustment, it is advantageous to arrange the fastening point of the circular part to be attached to the wind deflector approximately diametrically opposite the point of connection to the other part of the connecting element.

In order to make it possible to install the wind deflector in the simplest possible manner, so that even a layman can accomplish it, the part mountable on the wind deflector is preferably provided with a threaded bore, for example a nut welded in place, to accept a bolt passed through the wind deflector.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 is a partial schematic top view of a vehicle roof with a roof opening and a wind deflector constructed in accordance with the present invention;

FIG. 2 is a cross sectional view along line II—II in FIG. 1; and

FIG. 3 is a top view of a fastening element according to the invention.

DETAILED DESCRIPTION OF THE DRAWINGS

In FIG. 1, 1 refers to the vehicle roof, provided with a rectangular roof opening 2, said opening being surrounded by a roof frame 3, said frame 3 forming a rain gutter and supporting a track along the lateral edges of the roof opening, said track being designed to guide a sliding cover, not shown. In order to prevent wind noise and drafts from entering the interior of the vehicle when the latter is in motion, a convex wind deflector 5 is provided, said deflector 5 overlapping the forward area of roof opening 2 and resting on vehicle roof 1 along its forward edge 6 and its lateral edges 7. These edges are surrounded by a shaped rubber strip 8 to provide a tight fit. Wind deflector 5 is mounted on vehicle roof 1 by a mount which in the embodiment shown consists of two fastening elements 9 (one on each lateral side of the roof opening), said elements 9 fitting on the one hand on wind deflector 5 at a distance from forward edge 6 and the lateral edge 7 in question, and on the other hand on the vertical wall 10 of roof frame 3. As is particularly clear from FIG. 2, each fastening element 9 includes two parts 11 and 12, connected rotatably together at 13, part 11 being fastened by means of a screw 14 to the vertical wall 10 of roof frame 3, while part 12 is connected to wind deflector 5 by a bolt 15. Part 12 is provided with a nut 16 welded in place or, if it is sufficiently thick, with a threaded hole to accept bolt 15. A simple through hole can be provided instead, and fastening accomplished by means of a loose nut with a lock-washer, screwable on nut 15, according to yet other preferred embodiments of the invention.

It is apparent that by rotating parts 11 and 12 around pivot 13, the distance between the vertical planes 17 and 18 parallel to the longitudinal axis of the vehicle, in which plane the fastening points of fastening element 9 are located on the roof frame 3 and on the wind deflector 5, can be adjusted, so that fastening element 9 can be adjusted to roof openings 2 of different widths. Part 12 designed to be mounted on wind deflector 5 is circular in this embodiment, in order to present a pleasing appearance, and to increase the strength of this part. In order to provide the largest possible range of adjustment, pivot 13 and fastening point 16 are located diametrically opposite one another.

Wind deflector 5 is installed in such manner that fastening element 9 is placed loosely on wind deflector 5, wind deflector 5 is placed on the vehicle roof, and fastening element 9 is then rotated until vertical parts 11 come to rest against vertical frame parts 10. Then bolts 15 are tightened, the holes to be drilled for screws 14 are marked on the vertical frame parts 11, wind deflector 5 is removed, the holes for screws 14 are drilled, the wind deflector 5 is replaced, bolts 15 are loosened, and fastening elements 9 are screwed into position using screws 14. In order to ensure that wind deflector 5 is permanently mounted on vehicle roof 1, it is advantageous to press wind deflector 5 downward slightly when marking the holes to be drilled for screws 14; this is easily done in view of the elasticity of the plastic material conventionally employed. Then, when bolts 15 are tightened, wind deflector 5 will be tensioned against vehicle roof 1 at its edges 6, 7.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Mounting apparatus for mounting a wind deflector in position adjacent a closable vehicle panel opening; said mounting apparatus comprising:
   a first part,
   first fastening means for fastening said first part to a fixed vehicle frame adjacent the panel opening,
   a second part,
   second fastening means for fastening said second part to the wind deflector,
   and connecting means for connecting said first and second parts together in such a manner that said second part can be rotatably moved with respect to said first part to effect lateral adjustment of the respective fastening points of said first and second fastening means, said lateral adjustment being in a plane substantially parallel to said panel opening with one of said points being shifted toward or away from lateral edges of the panel opening whereby wind deflectors can be mounted to various width fixed panel openings 2. Apparatus according to claim 1, wherein said panel opening is a passenger compartment roof opening, and wherein said wind deflector rests on the vehicle roof along the wind deflectors forward and lateral edges when in an in-use mounted position.

3. Apparatus according to claim 2, wherein the second part is circular in shape and is rotatably connected by said connecting means near its edge with the first part, said first part extending at an obtuse angle from the second part.

4. Apparatus according to claim 3, wherein the second part is provided with a threaded hole to accept a bolt passed through the wind deflector, said bolt and threaded hole forming said second fastening means.

5. Apparatus according to claim 4, wherein said threaded hole is provided in a nut welded to said second part.

6. Apparatus according to claim 3, wherein the fastening point of said second fastening means is located diametrically opposite the point of connection of said connecting means.

7. Apparatus according to claim 4, wherein the fastening point of said second fastening means is located diametrically opposite the point of connection of said connecting means.

* * * * *